(12) United States Patent
Okita et al.

(10) Patent No.: US 8,301,293 B2
(45) Date of Patent: Oct. 30, 2012

(54) PROCESS INTEGRATION DETERMINING SYSTEM AND METHOD

(75) Inventors: Toshiyuki Okita, Nishio (JP);
Yoshimasa Kuwano, Aichi-gun (JP);
Kazunari Teramoto, Aichi-gun (JP)

(73) Assignee: Jtekt Corporation, Osaka-shi (JP)

( * ) Notice: Subject to any disclaimer, the term of this patent is extended or adjusted under 35 U.S.C. 154(b) by 181 days.

(21) Appl. No.: 12/820,282

(22) Filed: Jun. 22, 2010

(65) Prior Publication Data
US 2010/0324713 A1    Dec. 23, 2010

(30) Foreign Application Priority Data

Jun. 22, 2009 (JP) ................................. 2009-147833
Nov. 9, 2009 (JP) ................................. 2009-256173

(51) Int. Cl.
*G06F 19/00* (2011.01)
(52) U.S. Cl. .......... 700/179; 700/98; 700/173; 718/102
(58) Field of Classification Search ............ 700/98, 700/173, 179; 718/102
See application file for complete search history.

(56) References Cited

U.S. PATENT DOCUMENTS

| | | | | |
|---|---|---|---|---|
| 4,509,126 A | * | 4/1985 | Olig et al. ................. | 700/173 |
| 5,465,221 A | * | 11/1995 | Merat et al. ................ | 702/83 |
| 6,136,132 A | * | 10/2000 | Kinzie ........................ | 156/258 |
| 7,245,977 B1 | * | 7/2007 | Simkins ...................... | 700/98 |
| 7,409,686 B2 | * | 8/2008 | Yamada et al. .............. | 718/102 |
| 7,412,296 B2 | * | 8/2008 | Yamaguchi et al. .......... | 700/98 |
| 2001/0000805 A1 | * | 5/2001 | Kadono ....................... | 700/182 |
| 2004/0049487 A1 | * | 3/2004 | Yamada et al. .............. | 707/1 |
| 2004/0186614 A1 | * | 9/2004 | Yamaguchi et al. .......... | 700/179 |
| 2009/0119670 A1 | * | 5/2009 | Yamada et al. .............. | 718/102 |
| 2009/0126451 A1 | * | 5/2009 | Hase et al. .................. | 72/426 |

FOREIGN PATENT DOCUMENTS

JP    11-235646    8/1999

OTHER PUBLICATIONS

U.S. Appl. No. 12/820,321, filed Jun. 22, 2010, Okita, et al.

* cited by examiner

*Primary Examiner* — Ramesh Patel
*Assistant Examiner* — Anthony Whittington
(74) *Attorney, Agent, or Firm* — Oblon, Spivak, McClelland, Maier & Neustadt, L.L.P.

(57) ABSTRACT

A machined shape determining step of determining a machined shape machined by a basic tooling or basic tooling template of each machining efficiency group from a material shape (S19), a tooling determining step of determining an optimal tooling comprising a combination of a tool, a holder and a tool projection length on the basis of information of the tools and the holders, stored in a tool holder information storage unit, the combination having a maximum machining efficiency and being able to form the material shape into a corresponding one of the machined shapes without interfering with the machined shape (S20), a process candidate determining step of determining an optimal process candidate using the optimal tooling of each machining efficiency group (S21), and a process determining step of determining an optimal process on the basis of the optimal process candidate of each machining efficiency group (S10), are executed.

9 Claims, 17 Drawing Sheets

FIG.4
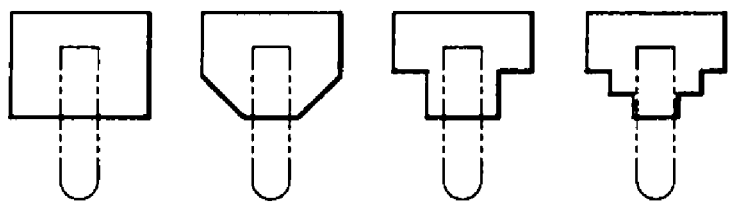
FIG.5
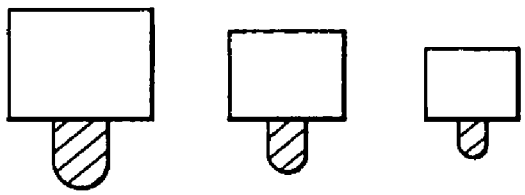
HIGH MACHINING EFFICIENCY GROUP
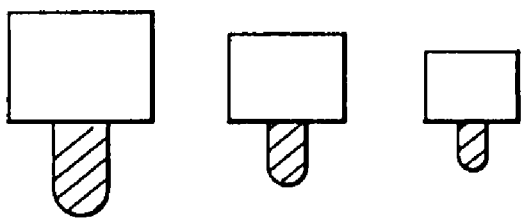
INTERMEDIATE MACHINING EFFICIENCY GROUP
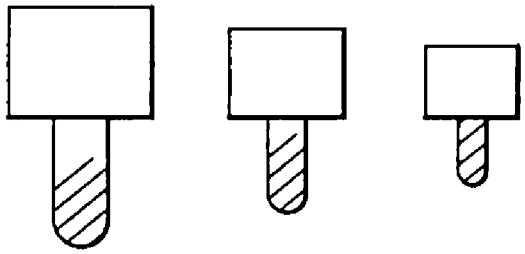
LOW MACHINING EFFICIENCY GROUP FIG. 10A          FIG. 10B
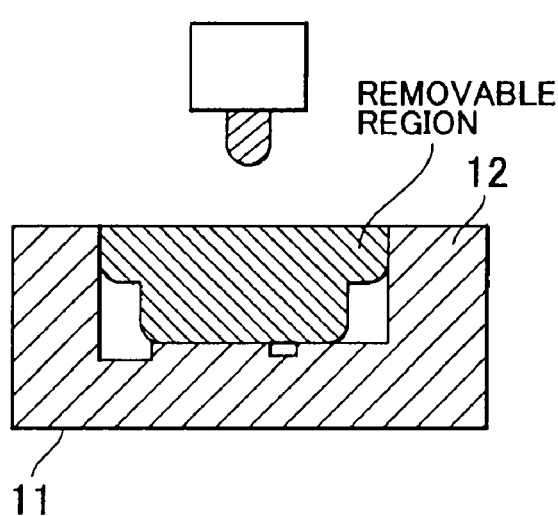
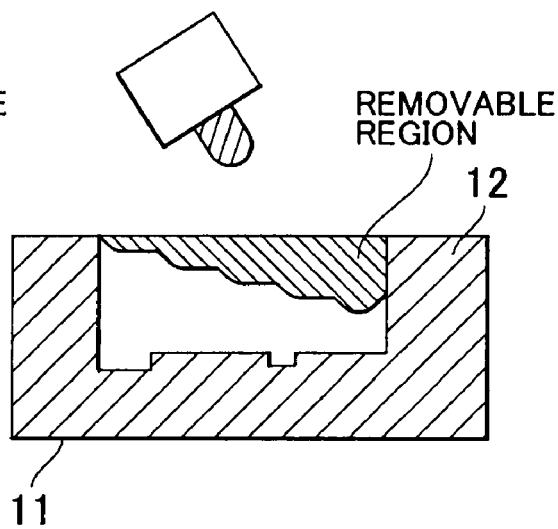
FIG. 11
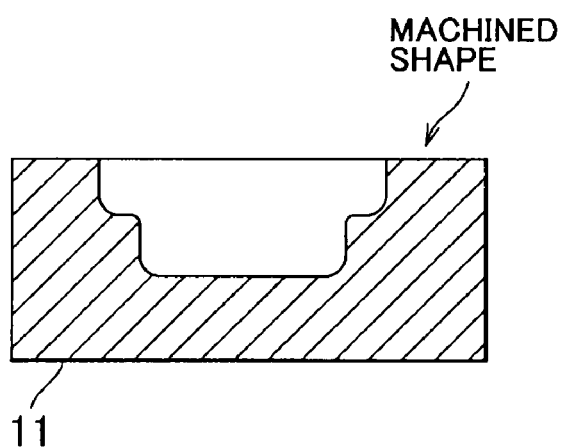
FIG. 12A          FIG. 12B
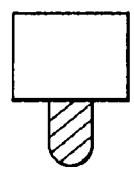
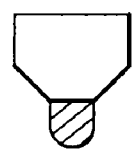

FIG.15

| HIGH MACHINING EFFICIENCY | | INTERMEDIATE MACHINING EFFICIENCY | | LOW MACHINING EFFICIENCY | |
|---|---|---|---|---|---|
| $\phi$18 | A11 PROCESS<br>A12 PROCESS<br>A13 PROCESS<br>... | $\phi$18 | B11 PROCESS<br>B12 PROCESS<br>B13 PROCESS<br>... | $\phi$18 | C11 PROCESS<br>C12 PROCESS<br>C13 PROCESS<br>... |
| $\phi$10 | A21 PROCESS<br>A22 PROCESS<br>A23 PROCESS<br>... | $\phi$10 | B21 PROCESS<br>B22 PROCESS<br>B23 PROCESS<br>... | $\phi$10 | C21 PROCESS<br>C22 PROCESS<br>C23 PROCESS<br>... |
| $\phi$8 | A31 PROCESS<br>A32 PROCESS<br>A33 PROCESS<br>... | $\phi$8 | B31 PROCESS<br>B32 PROCESS<br>B33 PROCESS<br>... | $\phi$8 | C31 PROCESS<br>C32 PROCESS<br>C33 PROCESS<br>... |

FIRST PROCESS TOOLING : A  SECOND PROCESS TOOLING : B  THIRD PROCESS TOOLING : C

|  | TOOL | HOLDER | EDGE DIAMETER | TOOL PROJECTION LENGTH |
|---|---|---|---|---|
| FIRST PROCESS | a1 | b1 | 10mm | 10mm |
| SECOND PROCESS | a2 | b2 | 5mm | 5mm |
| THIRD PROCESS | a2 | b1 | 5mm | 10mm |

SIMILARITY COEFFICIENT
(1) SAME TOOL              : 1000 POINTS
(2) SAME HOLDER            : 500 POINTS
(3) SAME EDGE DIAMETER     : 100 POINTS
(4) TOOL PROJECTION LENGTH :   10 POINTS − [DIFFERENCE IN TOOL PROJECTION LENGTH]

FIG. 17A

| |
|---|
| (1) FIRST PROCESS – SECOND PROCESS<br>   SIMILARITY = 0+0+0+5 = 5 POINTS |
| (2) FIRST PROCESS – THIRD PROCESS<br>   SIMILARITY = 0+500+0+10 = 510 POINTS |
| (3) SECOND PROCESS – THIRD PROCESS<br>   SIMILARITY = 1000+0+100+5 = 1105 POINTS |

FIG. 17B

| DESCENDING ORDER OF SIMILARITY |
|---|
| No. 1 : SECOND PROCESS – THIRD PROCESS |
| No. 2 : FIRST PROCESS – THIRD PROCESS |
| No. 3 : FIRST PROCESS – SECOND PROCESS |

FIG. 18

| | | FIRST PROCESS → | SECOND PROCESS → | THIRD PROCESS | ACTUAL MACHINING TIME | TOTAL TIME |
|---|---|---|---|---|---|---|
| | REMOVAL VOLUME | 300mm³ | 60mm³ | 30mm³ | | |
| (a) | TOOLING | A | B | C | 30 MINUTES | 30 MINUTES (= 30 MINUTES − 0 MINUTES) |
| | MACHINING EFFICIENCY | 30mm³/MINUTE | 6mm³/MINUTE | 3mm³/MINUTE | | |
| | MACHINING TIME | 10 MINUTES | 10 MINUTES | 10 MINUTES | | |
| (b) | TOOLING | A | C | C | 40 MINUTES | 20 MINUTES (= 40 MINUTES − 20 MINUTES) |
| | MACHINING EFFICIENCY | 30mm³/MINUTE | 3mm³/MINUTE | 3mm³/MINUTE | | |
| | MACHINING TIME | 10 MINUTES | 20 MINUTES | 10 MINUTES | | |
| (c) | TOOLING | C | C | C | 130 MINUTES | 90 MINUTES (= 130 MINUTES − 40 MINUTES) |
| | MACHINING EFFICIENCY | 3mm³/MINUTE | 3mm³/MINUTE | 3mm³/MINUTE | | |
| | MACHINING TIME | 100 MINUTES | 20 MINUTES | 10 MINUTES | | |

F I G . 19A
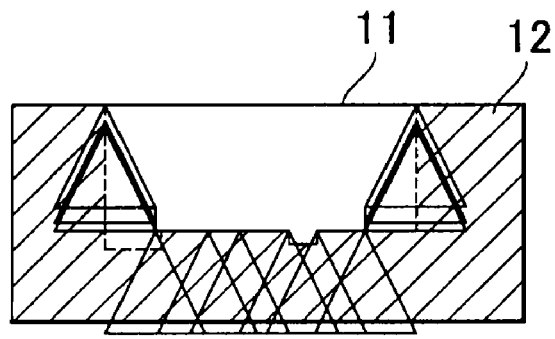
F I G . 19B
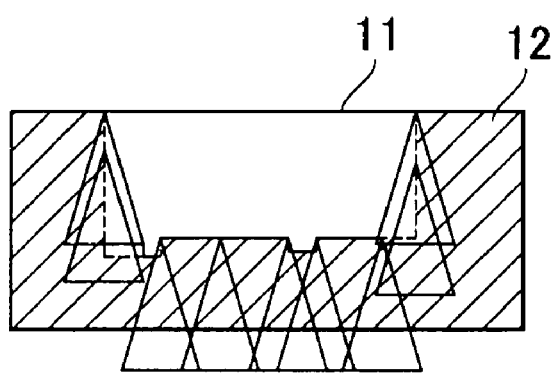
F I G . 19C
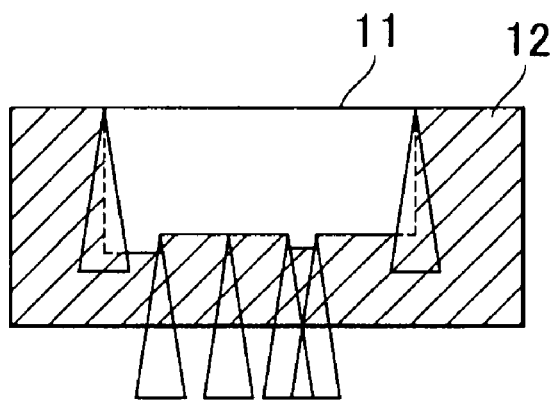

PROCESS INTEGRATION DETERMINING SYSTEM AND METHOD

INCORPORATION BY REFERENCE/RELATED APPLICATION

This application claims priority to Japanese Patent Applications No. 2009-147833 filed on Jun. 22, 2009 and 2009-256173 filed on Nov. 9, 2009, the disclosure of which, including the specification, drawings and abstract, is incorporated herein by reference in its entirety.

BACKGROUND OF THE INVENTION

1. Field of the Invention

The invention relates to a system and method that are used to determine an optimal process for forming a product shape from a material shape.

2. Discussion of Background

A system that determines a machining process is, for example, described in Japanese Patent Application Publication No. 11-235646 (JP-A-11-235646). In JP-A-11-235646, process candidates are selected in descending order of machining efficiency for a plurality of toolings each composed of a predetermined combination of a tool and a holder to thereby determine an optimal machining process.

In the system described in JP-A-11-235646, combinations of a tool and a holder are predetermined and then a conceivably optimal machining process is determined within a finite number of the toolings of the combinations. However, generally, even when a tool and a holder are selected one for each, a different tooling may be set by varying a tool projection length. Therefore, in the above system, an optimal machining process is determined within a limited range, so there may possibly be a further optimal machining process.

SUMMARY OF THE INVENTION

The invention provides a process determining system and method that are able to determine a further optimal machining process.

According to a feature of an example of the invention, it is possible to determine a machined shape using a basic tooling or basic tooling template of each machining efficiency group. The machined shape is a reference shape that is a reference according to each machining efficiency group. A combination of a tool, a holder and a tool projection length, that is able to form a material into the reference shape and that has the highest machining efficiency among various combinations of a tool and a holder, is determined. That is, according to the feature of an example of the invention, a combination of a tool, a holder and a tool projection length, having the highest machining efficiency, is selected from among infinite combinations of a tool, a holder and a tool projection length for each of a plurality of machining efficiency groups. Thus, in comparison with the existing art, it is possible to determine a further optimal process. The "machining efficiency" corresponds to a removal volume per unit time. For example, when the same workpiece material is cut by a tool of the same material, tool projection length (L)/tool edge diameter (D) (≈stiffness) may be used as the machining efficiency. In addition, the "machining efficiency group" means a group of which the machining efficiency falls within a predetermined range.

According to an another feature of an example of the invention, an optimal tooling is determined not only for each machining efficiency group but also for each tool edge diameter. Even when the machining efficiency group is the same, the tool edge diameter may be varied. Then, by determining an optimal tooling for each machining efficiency group and each tool edge diameter, it is possible to determine a further optimal process.

According to a further feature of an example of the invention, when a temporary optimal process is executed, a total removal region before excluding a process candidate may be removed. Thus, an overlap process may be reliably excluded while the same removal region is reliably ensured.

According to another feature of the invention, by way of example, an overlap process may be reliably excluded so as to be able to reduce a machining time.

Further by way of example, according to another aspect of the invention, changing a tool axis position is considered. For example, four-axis or five-axis machining is applicable. Furthermore, not only five-axis index machining but also five-axis simultaneous machining is applicable. Then, when a tool axis position may be changed, a removable region varies even with the same tooling. Then, a tool axis position having the largest removal volume is determined while changing the tool axis position, and then the machined shape in this state is determined. That is, an optimal process may be determined including a change in tool axis position.

According to a further feature of an example of the invention, a machined shape is determined for each of a plurality of basic tooling templates. That is, an optimal process candidate is determined for each basic tooling template. Here, there are a large number of various holder shapes and a large number of various tool projection lengths. That is, by providing a plurality of basic tooling templates, it is compatible with various combinations of a tool, a holder and a tool projection length. That is, by using a plurality of basic tooling templates, it is possible to determine an appropriate optimal process candidate.

According to a further feature of an example of the invention, by employing an inverted conical shape and a circular cylindrical shape as basic tooling templates, it is possible to represent outer shapes of a large number of combinations of a tool and a holder.

According to a further another feature of an example of the invention, by forming the circular cylindrical shape of the basic tooling template in an inverted stepped shape, it is possible to represent a further appropriate outer shape of a combination of a tool and a holder. That is, by defining basic tooling templates using an inverted conical shape and an inverted stepped shape formed of cylindrical shapes, it is possible to determine a sufficiently appropriate process candidate using a slight number of templates.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 4 is a view that shows information of a plurality of holders stored in a holder DB;

FIG. 5 is a view that shows a plurality of basic toolings stored in a basic tooling DB;

FIG. 10A and FIG. 10B are views that respectively show removable regions for different tool axis positions;

FIG. 11 is a view that shows a machined shape in the case of FIG. 10A;

FIG. 12A and FIG. 12B are views that show toolings having different machining efficiencies;

FIG. 15 shows processes subjected to efficiency-specific process candidate integration;

FIG. 17A shows a similarity for each process combination;

FIG. 17B shows combinations sorted in descending order of similarity;

FIG. 18 shows an actual machining time and a total time before process integration in row (a);

Figure 20A:
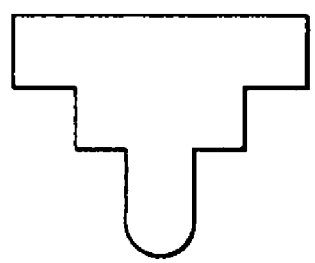
Figure 20B:
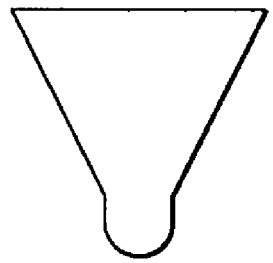
Figure 21A:
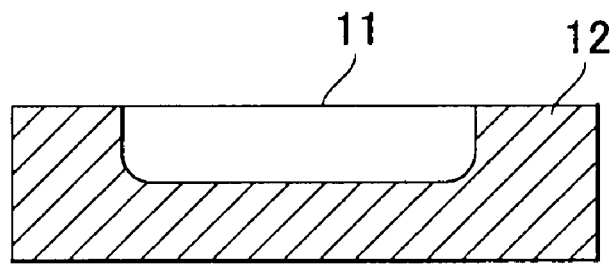
Figure 21B:
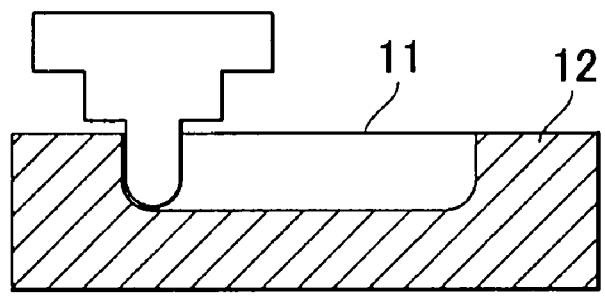
Figure 21C:
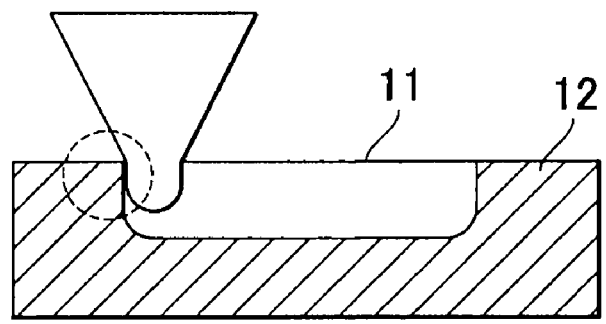
Figure 22A:
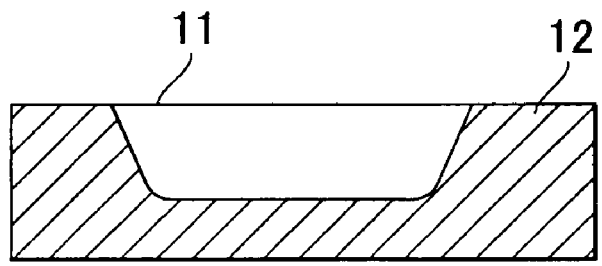
Figure 22B:
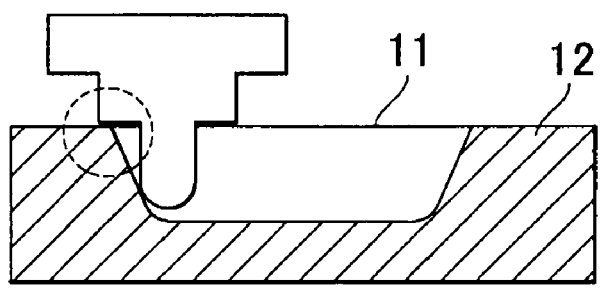
Figure 22C:
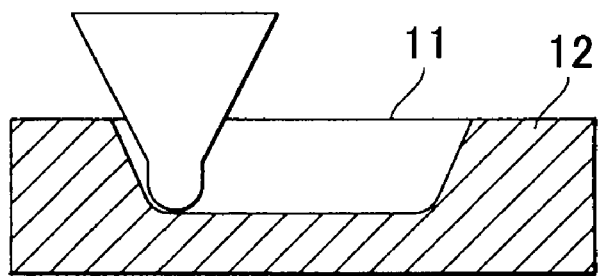
Figure 23:
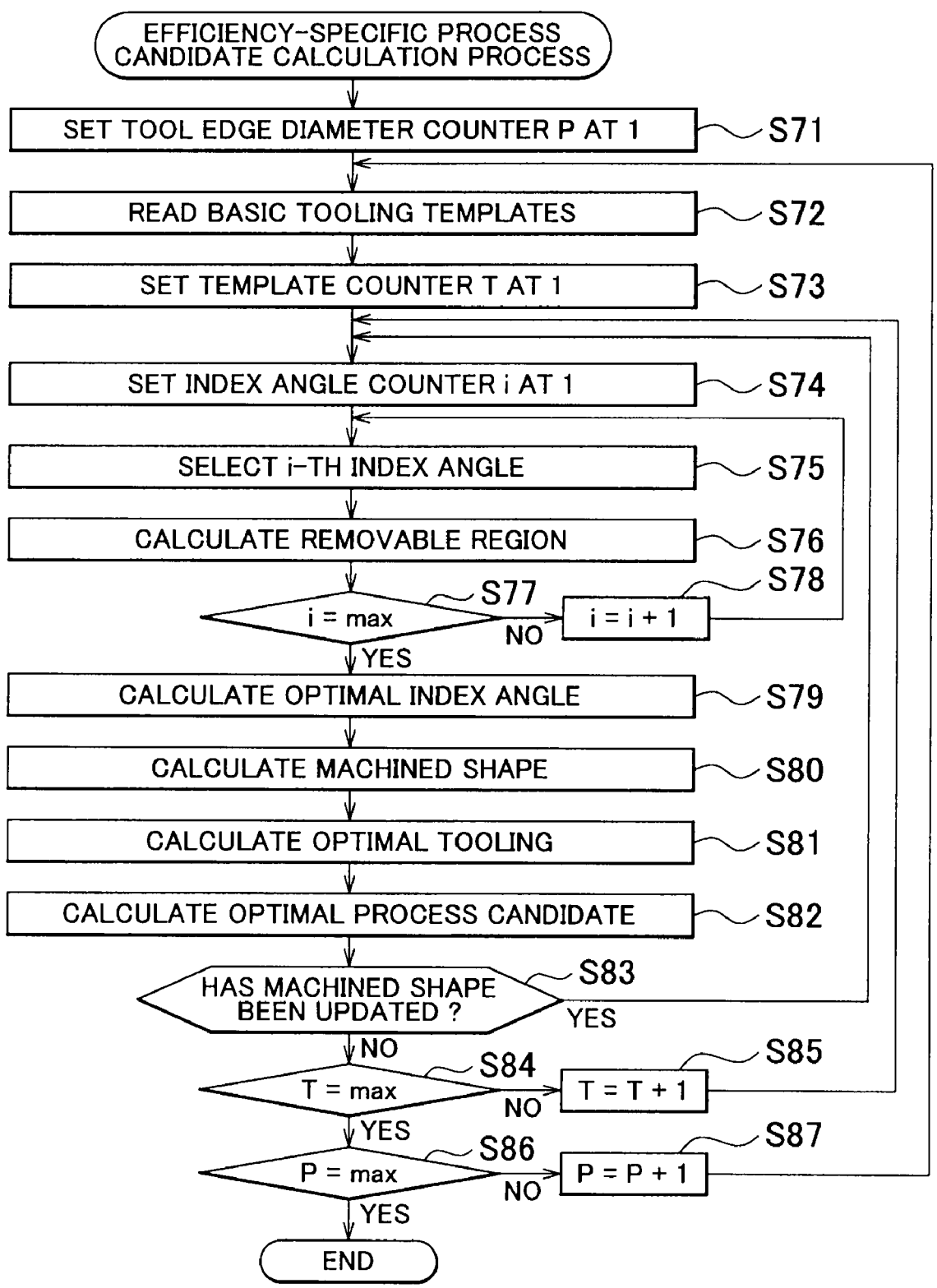

an actual machining time and a total time when an optimal tooling of a second process is integrated into an optimal tooling of a third process in row (b);

an actual machining time and a total time when optimal toolings of all the processes are integrated into the optimal tooling of the third process in row (c); and FIG. 19A, FIG. 19B and FIG. 19C show removable regions when basic tooling templates are used, and FIG. 19A, FIG. 19B and FIG. 19C respectively show high, intermediate and low machining efficiency groups;

FIG. 20A and FIG. 20B respectively show two types of basic tooling templates;

FIG. 21A, FIG. 21B and FIG. 21C are views that illustrate interference when a second basic tooling template is applied;

FIG. 22A, FIG. 22B and FIG. 22C are views that illustrate interference when a first basic tooling template is applied; and FIG. 23 is a flowchart of an efficiency-specific process candidate determining process.

DETAILED DESCRIPTION OF EMBODIMENTS

Hereinafter, embodiments of the invention will be described with reference to the accompanying drawings.

Figure 1:
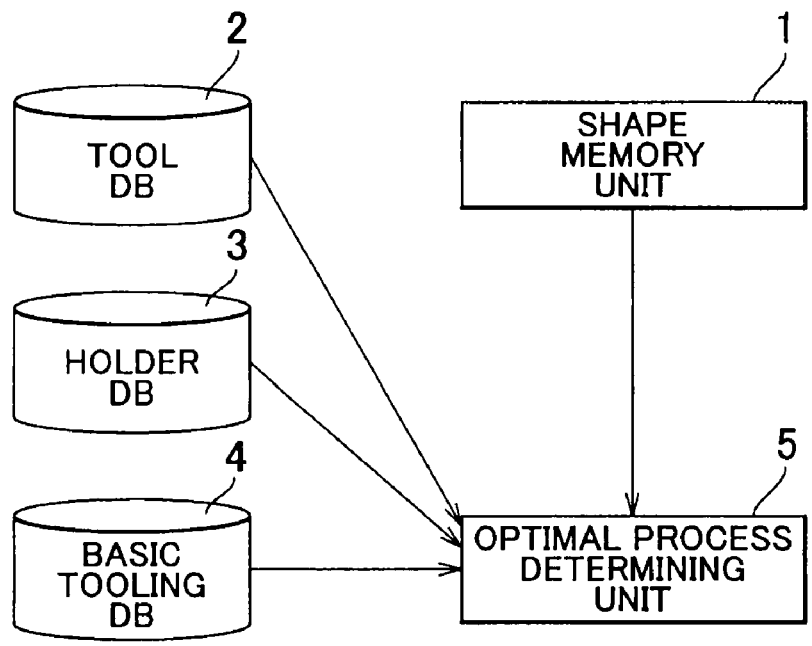
FIG. 1 is a configuration diagram of an optimal process determining system according to an embodiment.

A process determining system according to the present embodiment will be described with reference to an example illustrated in FIG. 1 to FIG. 5. As shown in FIG. 1, the process determining system includes a shape memory unit 1, a tool DB(Data Base) 2, a holder DB 3, a basic tooling DB 4 and an optimal process determining unit 5.

Figure 2:
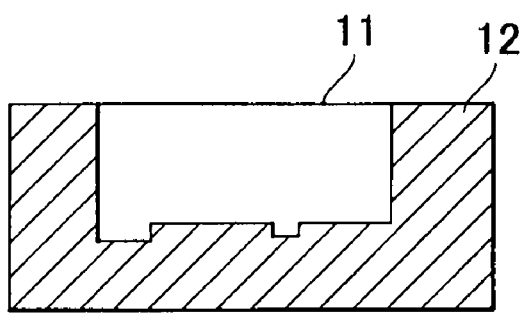
FIG. 2 is a view that shows a material shape and a product shape.

The shape memory unit 1 stores a material shape and a product shape created by a computer aided design (CAD) (not shown). In the present example, as shown in FIG. 2, the material shape is denoted by 11, and the product shape is denoted by 12. That is, the product shape 12 is formed from the material shape 11 by pocketing or milling in example. In the example, the bottom shape of a pocket portion has a deep portion and a shallow portion.

Figure 3:
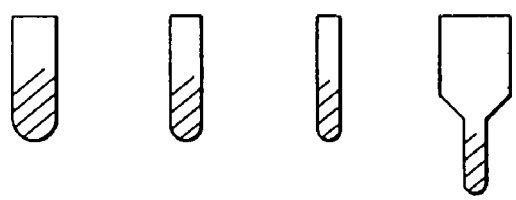
FIG. 3 is a view that shows information of a plurality of tools stored in a tool DB(data base)

The tool DB 2 (which is part of the tool holder information storage unit in the example) stores information of a plurality of tools. As shown in FIG. 3, by way of example, each of the tools is a ball end mill, and there are the plurality of tools having different edge diameters and different edge shapes. As used herein, the "edge diameter of a tool" means the outside diameter of an operating edge portion of the tool. For example, in FIG. 3, the leftmost tool has the largest edge diameter, the second tool from the left has the second largest edge diameter, and two types of tools on the right have the smallest edge diameters. In addition, as shown in FIG. 3, the shapes of the three types of tools on the left are such that a portion other than the distal end portion has a constant diameter circular cylindrical shape, and the shape of one type of tool on the right in FIG. 3 is such that a portion other than the distal end portion has a stepped circular cylindrical shape. That is, the shape of the type of tool on the right in FIG. 3 is formed of a shape having a base portion that is larger in outside diameter than the edge portion. Then, in the tool DB 2, tool numbers are respectively associated with pieces of information of the tools.

The holder DB 3 (which is also part of the tool holder information storage unit) stores information of a plurality of holders. As shown in FIG. 4, there are a plurality of types of holders that can respectively hold tools having different edge diameters and different edge shapes, and the holders that can hold the same tool also have multiple shapes. In the holder DB 3, holder numbers are respectively associated with pieces of information relating to the holders.

The basic tooling DB 4 (which is also part of the basic tooling storage unit according to the example) stores a basic tooling for each of a plurality of machining efficiency groups and for each of different edge diameters of the tools. The "basic tooling" is a combination of a tool, a holder and a tool projection length. The "machining efficiency" corresponds to a removal volume per unit time. For example, when a given workpiece material is cut by a tool of a given material, tool projection length (L)/tool edge diameter (D) (≈stiffness) may be used as the machining efficiency. In addition, the "machining efficiency group" means a group of which the machining efficiency falls within a predetermined range.

In this example, there are basic toolings for three types of high, intermediate and low machining efficiency groups. Here, for the high machining efficiency group, L/D is 5 or below; for the intermediate machining efficiency group, L/D is between 5 and 10; and for the low machining efficiency group, L/D is 10 or above.

The optimal process determining unit 5 determines an optimal process for forming the product shape from the material shape. The optimal process comprises a plurality of process candidates and the sequence of the process candidates. In this example, each process candidate includes information of a tooling, including a tool, a holder and a tool projection length, a removal region and an index angle (tool axis position). FIG. 6 to FIG. 9 are flowcharts that show an optimal process determining method for determining the optimal process. The process determining unit 5 can be, for example, a processor, controller or computer, and the stored data bases (DB) can be stored in an appropriate storage medium, such as in a memory of a computer, and can be part of the same device or separate from the device including the process determining unit 5. The determining system can be included in the control system of the machine tool, can be a separate system, or can be a system connected to a machine tool control system. Once the process is determined, the process is carried out by the machine tool to form products shaped using the process.

Figure 6:
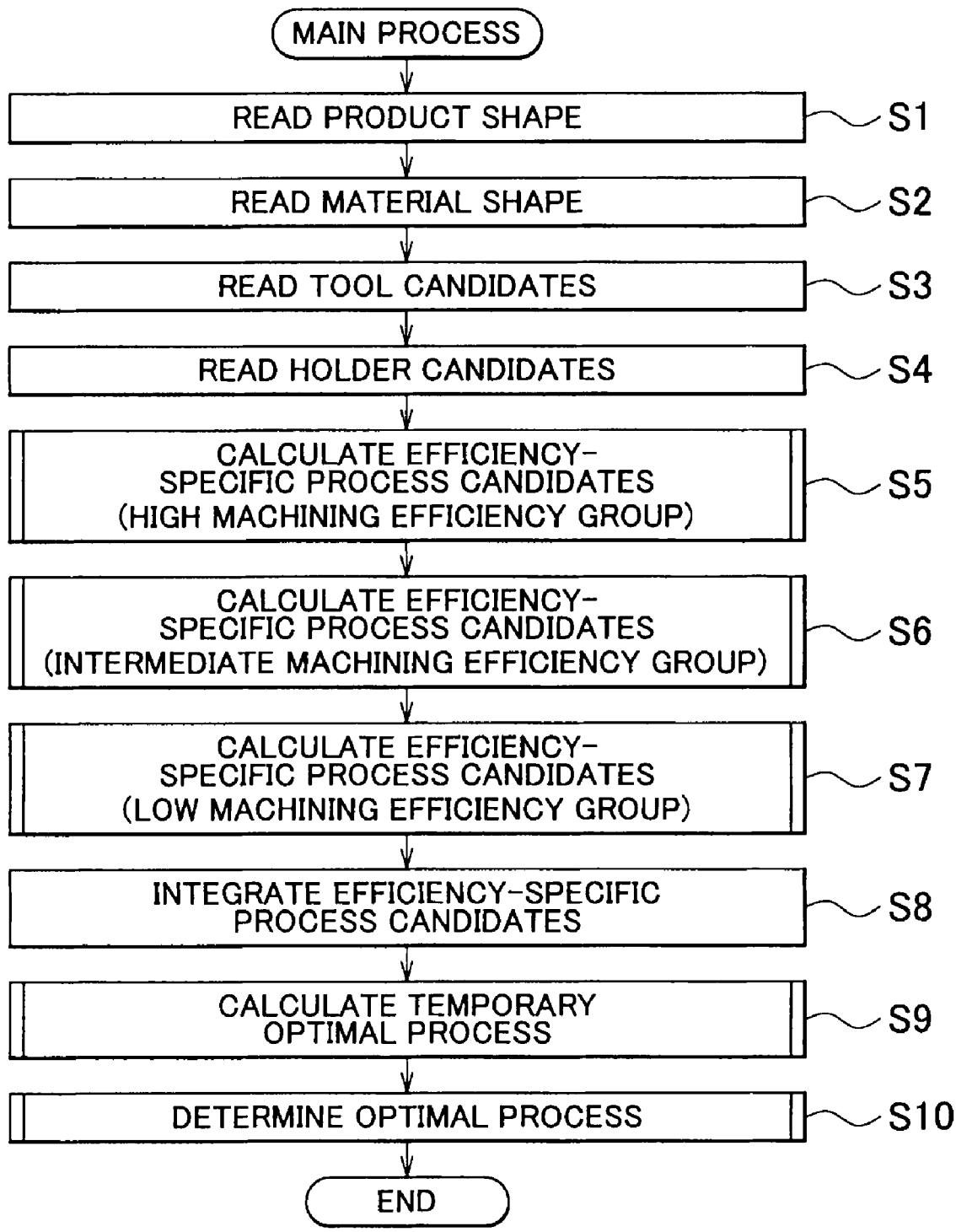
FIG. 6 is a flowchart of a main process executed by an optimal process determining unit.

As shown in FIG. 6, first, the optimal process determining unit 5 reads the product shape from the shape memory unit 1 (S1). Subsequently, the material shape is read from the shape memory unit 1 (S2). Thereafter, tool candidates are read from the tool DB 2 (S3), and holder candidates are read from the holder DB 3 (S4).

Figure 7:
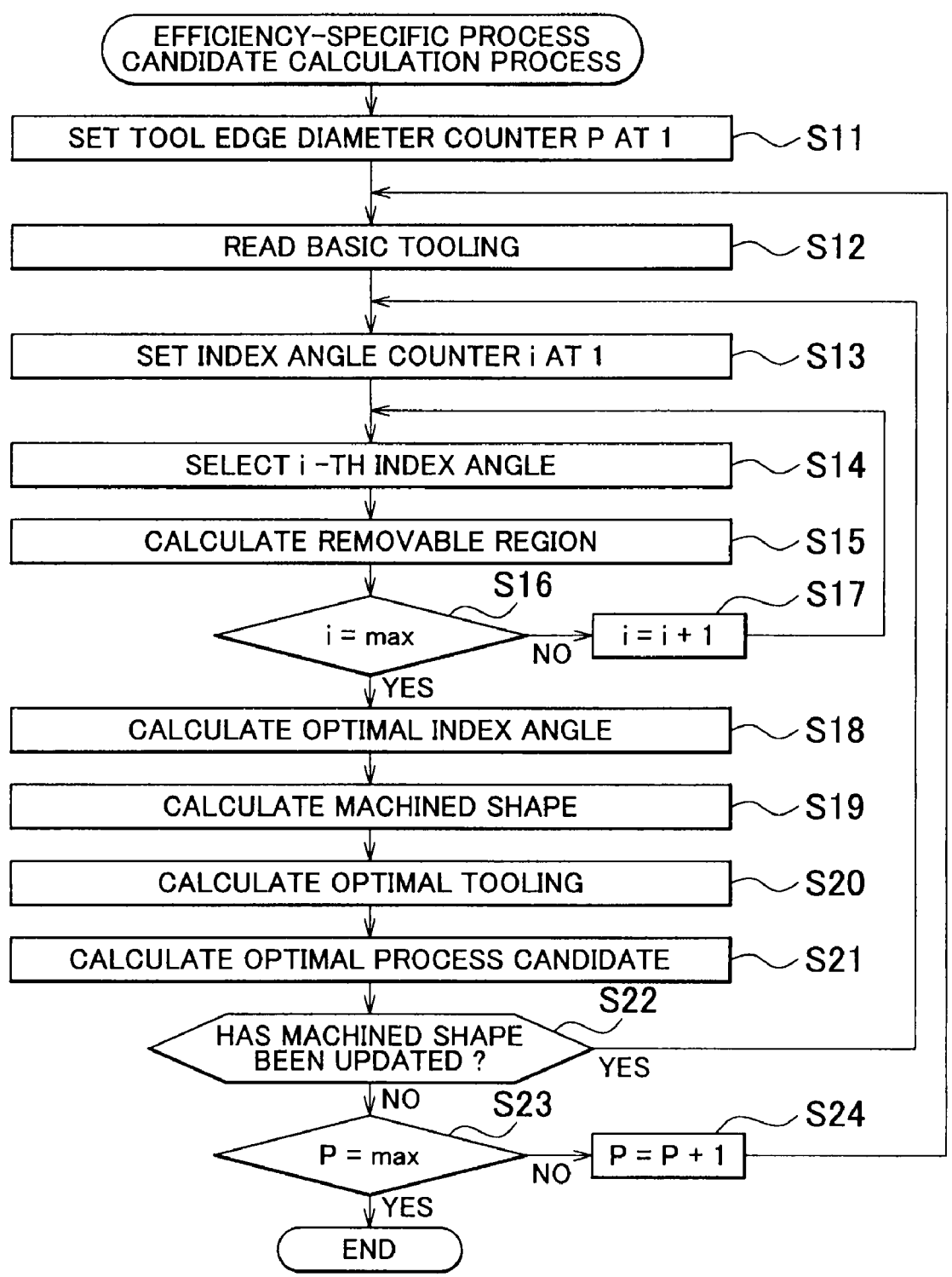
FIG. 7 is a flowchart of an efficiency-specific process candidate determining process.

After that, an efficiency-specific process candidate determining process is executed for a high machining efficiency group (S5). In the efficiency-specific process candidate determining process, as shown in FIG. 7, a tool edge diameter counter P is set at 1 (S11). Here, by way of example, among the tools stored in the tool DB 3, the counter P of the largest edge diameter, for example, φ18, is set at 1, the counter P of the second largest edge diameter, for example, φ10, is set at 2, and the counter P of the third largest edge diameter, for example, φ8, is set at 3.

Subsequently, a basic tooling for the high machining efficiency group is read from the basic tooling DB 4 (S12). Then, the counter i of the index angle of the tool is set at 1 (S13). The index angle corresponds to the tool axis position. Thereafter, the i-th index angle is selected (S14). That is, an actual index angle is selected (as discussed further below). After that, a removable region when the material shape is machined by the basic tooling at the selected index angle is calculated (S15).

The removable regions are shown in FIG. 10A and FIG. 10B. First, the removable region at a certain index angle is a hatched region indicated as the removable region in FIG. 10A. That is, the above removable region may be machined without interference of the tool or the holder with a portion of a product shape. When the index angle is changed, for example, the removable region is a hatched region indicated as the removable region in FIG. 10B.

The description will be provided by referring back to FIG. 7. Subsequently, it is determined whether the index angle counter i is a maximum value (S16). When the index angle counter i is not a maximum value, the index angle counter is incremented by 1 (S17) and then the process is repeated from step S14. That is, for each of a plurality of index angles, a removable region of the basic tooling is calculated.

After that, an index angle, at which a removal volume is maximal among the plurality of removable regions (for example, hatched regions indicated as the removable regions in FIG. 10A and FIG. 10B), is calculated (S18). When the index angle of FIG. 10A is compared with the index angle of FIG. 10B, the index angle of FIG. 10A is selected.

Then, a shape machined at the index angle determined in step S18 is determined (S19). As shown in FIG. 11, the machined shape is a shape excluding the removable region from the material shape. That is, the machined shape is a shape machined by the basic tooling from the material shape.

Subsequently, an optimal tooling is determined (S20). The optimal tooling is able to machine the material shape into the machined shape determined in step S19 without interfering with the machined shape, and has the highest machining efficiency. For example, it is assumed that the toolings shown in FIG. 12A and FIG. 12B are able to machine the material shape into the machined shape. In this case, when making a comparison between the tooling shown in FIG. 12A and the tooling shown in FIG. 12B, the tooling shown in FIG. 12B has a short tool projection length and, therefore, has a high machining efficiency. In this way, when a plurality of combinations of a tool, a holder and a tool projection length are obtained, the combination having the highest machining efficiency is selected from among the plurality of combinations. The basic tooling is an index tooling for obtaining a predetermined machining efficiency group, and may be different from the optimal tooling selected here or may be the same in some cases.

After that, an optimal process candidate using the optimal tooling determined in step S20 is determined (S21). The optimal process candidate is information relating to a plurality of processes, each including an optimal tooling and an optimal index angle.

Thereafter, it is determined whether the machined shape determined in step S19 is updated (S22). When the machined shape has been updated, the process is repeated from step S13. Initially, the machined shape is newly determined, so, of course, the process is repeated from S13. In the processes from the next step S13 to step S21, the processes are executed while the initially calculated machined shape is regarded as a material shape.

Figure 13A:
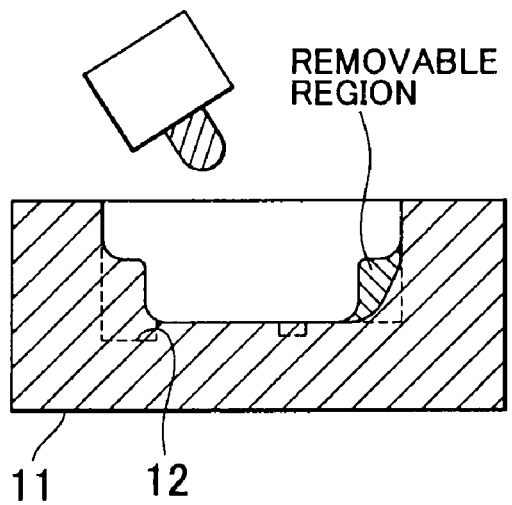
FIG. 13A shows a removable region for a changed tool axis position.
Figure 13B:
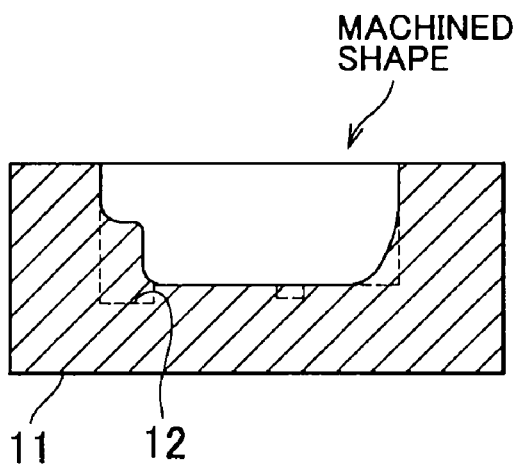
FIG. 13B shows a machined shape in the case of FIG. 13A.

For example, when machining is performed using the shape shown in FIG. 11 as a material shape, the hatched region indicated as the removable region in FIG. 13A is a removable region, and the shape shown in FIG. 13B is a machined shape. Then, in step S21, this process is added to the already determined optimal process candidate. Then, in step S22, it is determined that the machined shape has been updated, so the process is repeated from step S13 again.

Figure 14A:
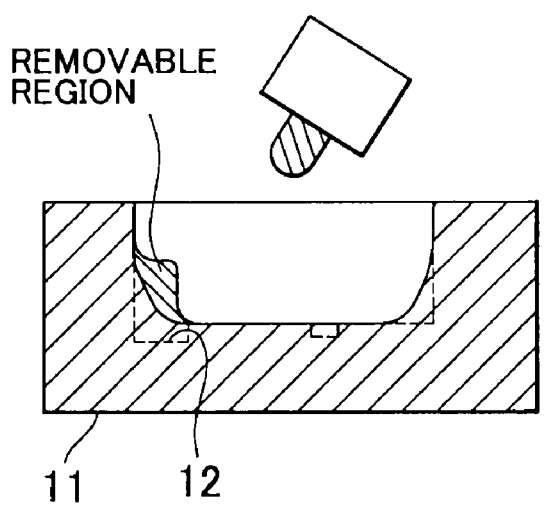
FIG. 14A shows a removable region for a further changed tool axis position.
Figure 14B:
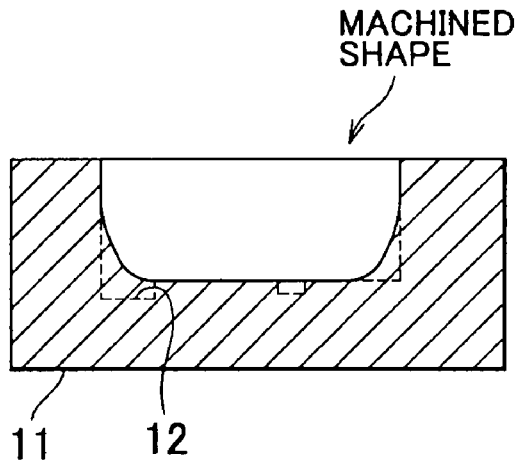
FIG. 14B shows a machined shape in the case of FIG. 14A.

In order to further continue the process, machining is performed using the shape shown in FIG. 13B as a material shape. In this case, the hatched region indicated as the removable region in FIG. 14A is a removable region, and the shape shown in FIG. 14B is a machined shape. Then, in step S21, this process is added to the already determined optimal process candidate. Then, in step S22, it is determined that the machined shape has been updated, so the process is repeated from step S13 again.

Subsequently, when the machined shape is not updated any more, it is determined whether the tool edge diameter counter P is a maximum value (S23). When the tool edge diameter counter P is not a maximum value, the tool edge diameter counter P is incremented by 1 (S24) and then the process is repeated from step S12. That is, an optimal process candidate is determined for each of the plurality of tool edge diameters. Then, when the tool edge diameter counter P reaches the maximum value, the efficiency-specific process candidate determining process is ended.

The description will be provided by referring back to FIG. 6. In the above description, the efficiency-specific process candidate determining process in the case of the high machining efficiency group is executed in step S5. Subsequently, the efficiency-specific process candidate determining process in the case of the intermediate machining efficiency group is executed (S6). In addition, after that, the efficiency-specific process candidate determining process in the case of the low machining efficiency group is executed (S7). In this way, an optimal process candidate is determined for each of the plurality of different machining efficiency groups and each of the tool edge diameters.

Thereafter, the optimal process candidates determined respectively in steps S5 to S7 are integrated to determine a temporary optimal process (S9). For example, as shown in FIG. 15, the processes are integrated in order of the optimal process candidates for the high machining efficiency group, the optimal process candidates for the intermediate machining efficiency group and the optimal process candidates for the low machining efficiency group. The processes included in each of the optimal process candidates correspond to individual processes. That is, each of the individual processes includes information of a tooling, which includes a tool, a holder and a tool projection length, a removal region and an index angle (tool axis position).

Figure 8:
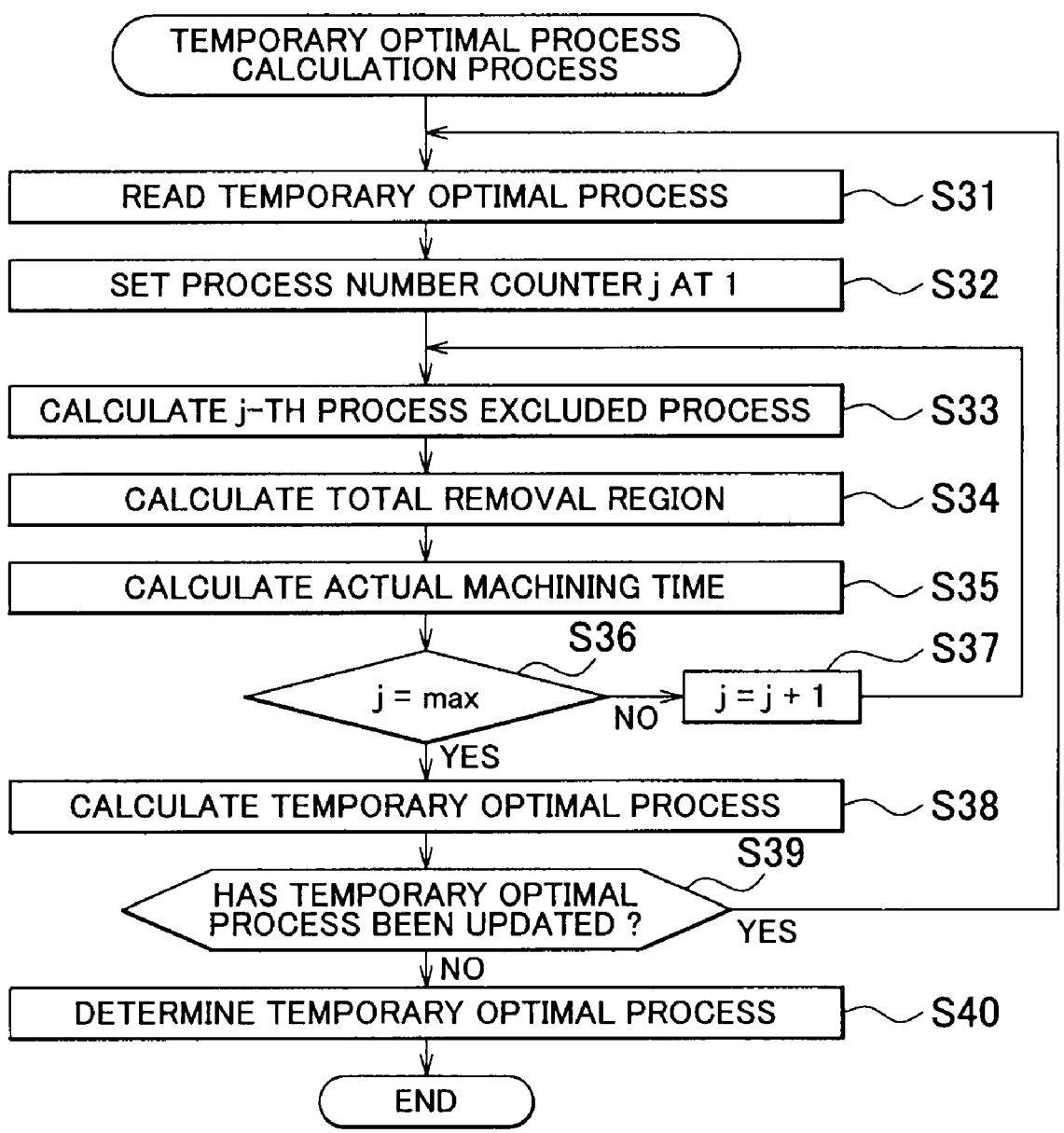
FIG. 8 is a flowchart of a temporary optimal process determining process.

Subsequently, a further optimal temporary optimal process is determined on the basis of the integrated temporary optimal process. This process is shown in FIG. 8. As shown in FIG. 8, first, in the temporary optimal process determining process, the temporary optimal process determined in step S8 in FIG. 6 is read (S31).

The process number counter j of the individual process of the temporary optimal process is set at 1 (S32). In addition, a process that excludes the j-th process from the individual processes (j-th process excluding process) is determined (S33). After that, first, a total removal region when the current temporary optimal process (all the individual processes) is executed is determined (S34). At the same time, a total removal region when the j-th process excluding process (remaining individual processes excluding the j-th process) is executed is determined (S34). Subsequently, an actual machining time when the current temporary optimal process is executed is determined (S35). At the same time, an actual machining time when the j-th process excluding process is executed is determined (S35).

After that, it is determined whether the process number counter j is a maximum value (S36). When the process number counter j is not a maximum value, the process number counter j is incremented by 1 (S37) and then the process is repeated from step S33. That is, a total removal region and an actual machining time are determined for each of partially excluded processes that are obtained by sequentially excluding one of the individual processes.

Then, as the process number counter j reaches the maximum value, the temporary optimal process is determined (updated). That is, when the plurality of optimal process candidates are partially excluded, a partially excluded process of which the total removal region coincides with the total removal region of the temporary optimal process is extracted. That is, among the partially excluded process, a partially excluded process that can remove the total removal region of the current temporary optimal process is extracted. In addition, when a plurality of partially excluded processes are extracted, the process having the shortest actual machining time among the plurality of partially excluded processes is used to update the temporary optimal process (S38).

Thereafter, when the temporary optimal process has been updated (S39), the process is repeated from step S31. Here, the temporary optimal process read in step S31 is the temporary optimal process updated in step S38. That is, by repeating steps S31 to S38, individual processes may be excluded so that the total removal region remains unchanged and the actual machining time reduces. By so doing, individual processes having substantially overlapping removal regions are excluded.

Then, when the temporary optimal process is not updated any more (S39), the temporary optimal process determined in step S38 is determined as the temporary optimal process (S40). Then, the temporary optimal process determining process is ended.

Figure 9:
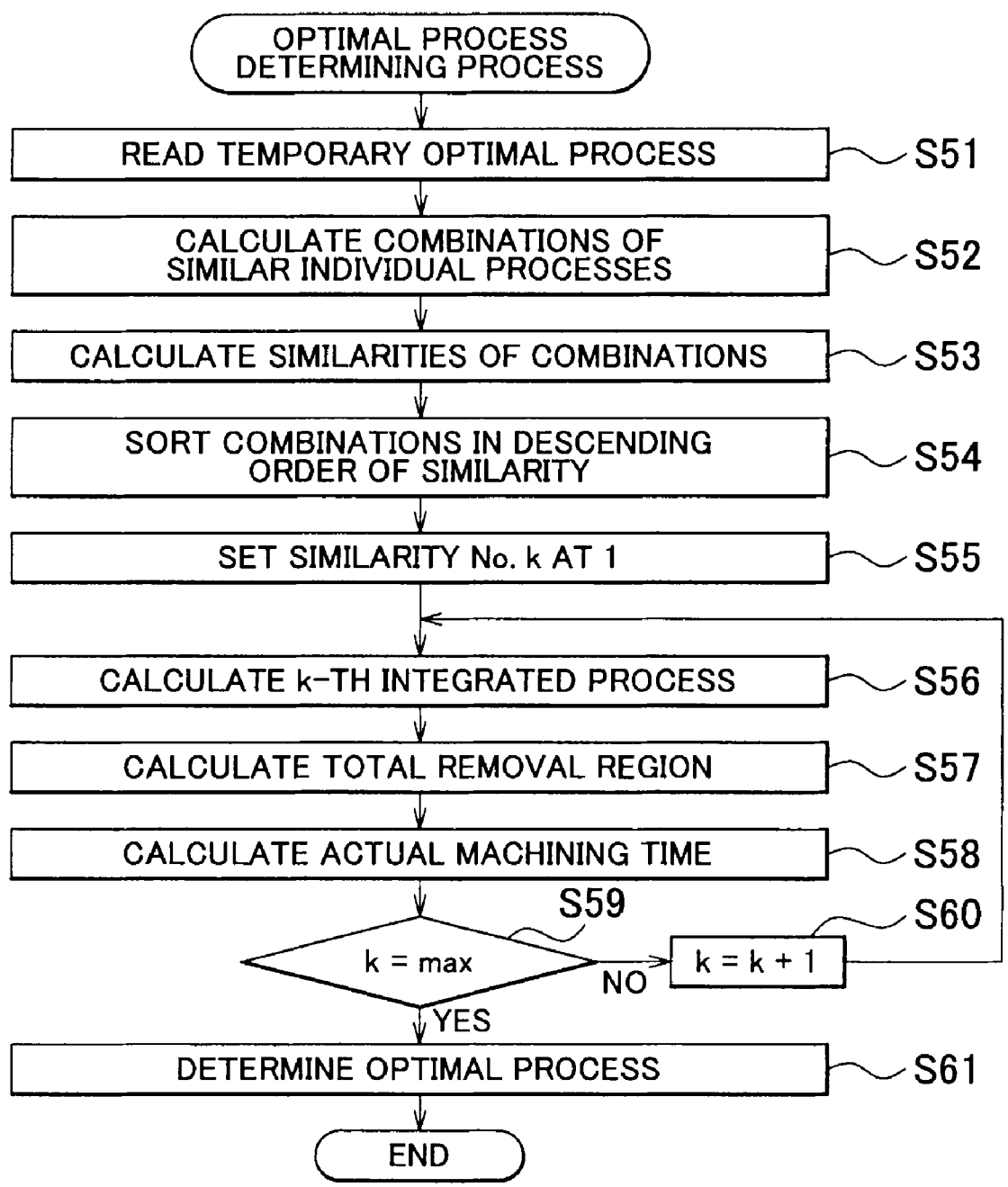
FIG. 9 is a flowchart of an optimal process determining process.

The description will be provided by referring back to FIG. 6. In step S9, the temporary optimal process determining process is executed. Subsequently, an optimal process determining process for determining a further optimal process is executed on the temporary optimal process (S10). The optimal process determining process is shown in FIG. 9. As shown in FIG. 9, first, in the optimal process determining process, the temporary optimal process determined in step S9 in FIG. 6 is read (S51).

Figures 16A, 16B, 16C:
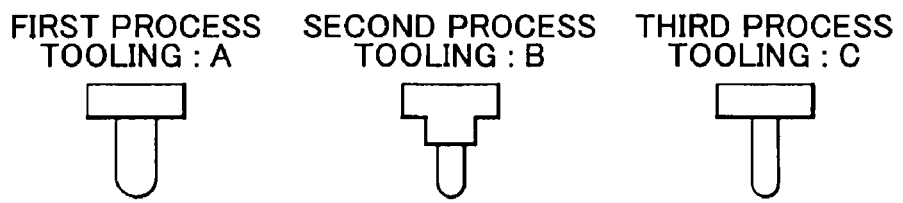
FIG. 16A shows an optimal tooling of each process.
FIG. 16B shows the specifications of each process.
FIG. 16C shows a similarity coefficient for each of the specifications.

After that, two similar individual processes are selected from the temporary optimal process (S52), and then a similarity between the toolings of the two individual processes is determined (S53). The similarity will be described with reference to FIG. 16A to FIG. 17B. Individual processes in the temporary optimal process will be described as first to third processes. Here, it is assumed that the tooling of the first process, the tooling of the second process and the tooling of the third process are determined as shown in FIG. 16A. The specifications of each tooling are shown in FIG. 16B. That is, elements of the similarity include the type of tool, the type of holder, a tool edge diameter and a tool projection length. At this time, similarity coefficients are preset as shown by way of example in FIG. 16C. The similarity coefficient is varied among the elements.

By so doing, as shown in (1) of FIG. 17A, the similarity between the first process and the second process scores 5 points; as shown in (2) of FIG. 17A, the similarity between the first process and the third process scores 510 points; and, as shown in (3) of FIG. 17A, the similarity between the second process and the third process scores 1105 points. In (1) to (3) of FIG. 17A, four numerals for calculating a similarity sequentially indicate, from the left, (1) a similarity coefficient for the same tool, (2) a similarity coefficient for the same holder, (3) a similarity coefficient for the same edge diameter and (4) a similarity coefficient for the tool projection length in FIG. 16C.

Subsequently, the combinations are sorted in descending order of similarity (S54). That is, as shown in FIG. 17B, the combination of "the second process and the third process" having the highest similarity is a similarity No. 1, the combination of "the first process and the third process" having the second highest similarity is a similarity No. 2, and the combination of "the first process and the second process" having the third highest similarity is a similarity No. 3.

After that, the counter k of the similarity No. is set at 1 (S55). Thereafter, an integrated process when the tooling of one of the processes of the similarity No. k is integrated into the tooling of the other one of the processes of the similarity No. k is calculated (S56). That is, an initially determined integrated process includes an integrated process obtained by integrating the tooling of the second process into the tooling of the third process and an integrated process obtained by integrating the tooling of the third process into the tooling of the second process.

Thereafter, total removal regions when the respective integrated processes are performed are determined (S57). Then, actual machining times when the respective integrated processes are performed are determined (S58). Subsequently, the optimal process determining unit 5 determines whether the similarity No. k is a maximum value (S59). When the similarity No. k is not a maximum value, the optimal process determining unit 5 adds 1 to the similarity No. k (S60) and then repeats the process from step S56. That is, each of the similarity Nos. is integrated in descending order, and then a total removal region and an actual machining time are determined for each of the integrated processes that can be integrated.

When the similarity No. k reaches a maximum value, an optimal process is determined from among the temporary optimal process and the plurality of integrated processes (S61). In determination of an optimal process, first, only the integrated processes that have the same total removal region as the total removal region of the temporary optimal process are extracted. After that, an optimal process is determined from among the extracted integrated processes and the temporary optimal process.

A temporary optimal process is shown in the row (a) in the table of FIG. 18, a process that integrates a tooling "B" of the second process into a tooling "C" of the third process among the extracted integrated processes is shown in the row (b) in the table of FIG. 18, and a process that integrates toolings "A" and "B" of the first process and second process into the tooling "C" of the third process among the extracted integrated processes is shown in the row (c) in the table of FIG. 18.

In order to make a comparison among the processes, the case set as follows is taken as an example. The removal volume of the first process is 300 mm³, and the machining efficiency (removal volume per unit time) of the tooling "A" of the first process is 30 mm³/minute. The removal volume of the second process is 60 mm³, and the machining efficiency of the tooling "B" of the second process is 6 mm³/minute. The removal volume of the third process is 30 mm³, and the machining efficiency of the tooling "C" of the third process is 3 mm³/minute.

Then, in the temporary optimal process, the actual machining time of the first process is 10 minutes, the actual machining time of the second process is 10 minutes, and the actual machining time of the third process is 10 minutes. That is, the actual machining time of the temporary optimal process is 30 minutes.

In the case of the integrated process of row (b) of FIG. 18, the first process uses the tooling "A", and the second process and the third process use the tooling "C". That is, the integrated process row (b) of FIG. 18 shows the case where the tooling of the second process is integrated into the tooling of the third process. In this case, the actual machining time of the first process is 10 minutes, the actual machining time of the second process is 20 minutes, and the actual machining time of the third process is 10 minutes. That is, the actual machining time of the temporary optimal process is 40 minutes.

In the case of the integrated process of row (c) of FIG. 18, all the first to third processes use the tooling "C". That is, the integrated process of row (c) of FIG. 18 shows the case where the toolings of the first and second processes are integrated into the tooling of the third process. In this case, the actual machining time of the first process is 100 minutes, the actual machining time of the second process is 20 minutes, and the actual machining time of the third process is 10 minutes. That is, the actual machining time of the temporary optimal process is 130 minutes.

Then, a total time is calculated in consideration of a unit integration reduction time for the actual machining time. The total time is calculated by [Actual Machining Time]−[Unit Integration Reduction Time]×[Number of Integrations]. Here, the unit integration reduction time is a value corresponding to a possession conversion time that is obtained by converting the possession of a tool and a holder by a user of a machine into a time, a tooling preparation time for setting a tool and a holder to the machine or a time consumed for the number of times of tool replacement carried out for machining. Here, the unit integration reduction time is 20 minutes.

In addition, the number of integrations is a number by which the toolings of the processes in the temporary optimal process are integrated. That is, the number of integrations in the case of row (b) of FIG. 18 is 1, and the number of integrations in the case of row (c) of FIG. 18 is 2.

Thus, as indicated in the column of total time in FIG. 18, the total time of the temporary optimal process shown in row (a) of FIG. 18 is 30 minutes, the total time of the integrated process shown in row (b) of FIG. 18 is 20 minutes, and the total time of the integrated process shown in row (c) of FIG. 18 is 90 minutes. The process having the shortest total time is the integrated process shown in row (b) of FIG. 18. Then, the above integrated process is determined as the optimal process.

By determining the optimal process as described above, it is possible to determine a further optimal process. In addition, by making a comparison among the temporary optimal process and the integrated processes on the basis of a total time in consideration of a unit integration reduction time, even when the actual machining time is elongated, the integrated process is determined to be optimal when a time obtained by multiplying the unit integration reduction time by the number of individual processes integrated is longer than the elongated actual machining time. By so doing, it is possible to achieve a reduction in total time at an actual worksite.

Particularly, by setting a value of a unit integration reduction time so as to correspond to a possession conversion time, it is possible to reduce the number of tools and the number of holders, possessed by a user of a machine, and it is not necessary to purchase a new tool or a new holder. A reduction in the number of tools or the number of holders possessed enables reduction in costs of storage and management. Thus, a total time may be eventually reduced, and costs may be reduced.

In addition, by setting a value of a unit integration reduction time so as to correspond to a tooling preparation time, it is possible to reduce a total working time with a reduction in tooling preparation time. In addition, by setting a value of a unit integration reduction time so as to correspond to a time consumed for the number of times of tool replacement, it is possible to reduce a total working time with a reduction in time consumed for the number of times of tool replacement.

In addition, an element of the similarity is any one of the type of tool, the type of holder, a tool projection length and a tool edge diameter, and the similarity coefficient of each element is varied. By so doing, easiness of integration of processes and influence when the processes are integrated may be considered. By so doing, it is possible to determine a further optimal process.

Second Embodiment

In addition, in the example of the above embodiment, a removable region is determined using the basic tooling (S15) in the efficiency-specific process candidate determining process shown in FIG. 7. Other than the above, templates shown in FIG. 19A to FIG. 19C, corresponding to basic toolings, may be used. For example, these templates each have a shape that is obtained so that the vertex of a cone shape traces a machined surface of a product shape. Then, the basic tooling template, as well as the above described basic tooling, is set for each of the plurality of machining efficiency groups. For example, the basic tooling templates respectively shown in FIG. 19A, FIG. 19B and FIG. 19C correspond to the high, intermediate and low machining efficiency groups, respectively. In addition, in the above embodiment, there are three types of machining efficiency groups, that is, high, intermediate and low; instead, there may be two types of machining efficiency groups or four or more types of machining efficiency groups.

Third Embodiment

In the example of the second embodiment, one type of basic tooling template is set for each machining efficiency group. Other than the above, it is also applicable that a plurality of basic tooling templates are set for each machining efficiency group, and machined shapes are respectively determined using the basic tooling templates to thereby make it possible to calculate optimal process candidates.

The shapes shown in FIG. 20A and FIG. 20B are set as a plurality of basic tooling templates. In the basic tooling template shown in FIG. 20A, a holder portion has a shape such that a small-diameter circular cylindrical shape and a large-diameter circular cylindrical shape are coaxially connected from a tool side (lower side in the drawing). That is, the holder portion is formed in an inverted stepped shape formed of the circular cylindrical shapes. As shown in FIG. 20B, the other basic tooling template has a holder portion formed in an inverted conical shape. Here, the basic tooling templates shown in FIG. 20A and FIG. 20B belong to the same machining efficiency group. That is, the tool projection length of the basic tooling template having the inverted stepped holder portion shown in FIG. 20A is longer than the tool projection length of the basic tooling template having the inverted conical holder portion shown in FIG. 20B. This is due to the influence of stiffness of the holder portion.

Next, the reason why these two types of basic tooling templates are set will be described with reference to FIG. 21A to FIG. 22C. Here, in FIG. 21A to FIG. 22C, the material shape is denoted by 11, and the product shape is denoted by 12.

First, it is assumed that a pocket shape shown in FIG. 21A is formed. When the pocket shape is machined by the first basic tooling template (stepped shape), it is possible to perform machining to the deepest position of the pocket shape as shown in FIG. 21B. On the other hand, when the pocket shape is machined by the second basic tooling template (inverted conical shape), because the holder portion interferes with an edge portion as shown in FIG. 21C, it is not possible to perform machining to the deepest position of the pocket shape.

Next, it is assumed that a pocket shape shown in FIG. 22A is formed. When the pocket shape is machined by the first basic tooling template (stepped shape), because the holder portion interferes with an edge portion as shown in FIG. 22B, it is not possible to perform machining to the deepest position of the pocket shape. On the other hand, when the pocket shape is machined by the second basic tooling template (inverted conical shape), it is possible to perform machining to the deepest position of the pocket shape shown in FIG. 22C.

In this way, it is apparent that, even when the machining efficiency group is the same, an optimal machining process varies depending on the shape of the holder portion and the tool projection length. Then, two types of basic tooling templates shown in FIG. 20A and FIG. 20B are set. Although not shown in the drawing, two types of basic tooling templates are set for each machining efficiency group.

An efficiency-specific process candidate determining process in this case will be described with reference to FIG. 23. First, a tool edge diameter counter P is set at 1 (S71). Here, among the tools stored in the tool DB 3, the counter P of the largest edge diameter, for example, φ18, is set at 1, the counter P of the second largest edge diameter, for example, φ10, is set at 2, and the counter P of the third largest edge diameter, for example, φ8, is set at 3.

Subsequently, basic tooling templates for the high machining efficiency group are read from the basic tooling DB 4 (S72). The basic tooling templates read here are two types, that is, the template having a stepped circular cylindrical holder portion and the template having an inverted conical holder portion. Then, a template counter T is set at 1 (S73). That is, the basic tooling template having the stepped circular cylindrical holder portion shown in FIG. 20A is set.

After that, the counter i of the index angle of the tool is set at 1 (S74). The index angle corresponds to the tool axis position. Thereafter, the i-th index angle is selected (S75). That is, an actual index angle is selected. After that, a removable region when the material shape is machined by the selected basic tooling at the selected index angle is calculated (S76).

Subsequently, it is determined whether the index angle counter i is a maximum value (S77). When the index angle counter i is not a maximum value, the index angle counter i is incremented by 1 (S78) and then the process is repeated from step S75. That is, for each of the plurality of index angles, a removable region of the selected basic tooling template is determined.

After that, an index angle, at which a removal volume is maximal among a plurality of removable regions, is determined (S79). Then, a shape machined at the index angle calculated in step S79 is determined (S80). The machined shape is a shape excluding the removable region from the material shape. That is, the machined shape is a shape machined by the basic tooling template from the material shape.

Subsequently, an optimal tooling is determined (S81). The optimal tooling is able to machine the material shape into the machined shape determined in step S80 without interfering with the machined shape, and has the highest machining efficiency. After that, an optimal process candidate using the optimal tooling determined in step S81 is determined (S82). The optimal process candidate is process information, including an optimal tooling and an optimal index angle.

Thereafter, it is determined whether the machined shape determined in step S80 is updated (S83). When the machined shape has been updated, the process is repeated from step S74. Initially, the machined shape is newly determined, so, of course, the process is repeated from S74. In the processes from the next step S74 to step S82, the processes are executed while the initially determined machined shape is regarded as a material shape. Then, in step S82, this process is added to the already determined optimal process candidate. Then, in step S83, it is determined that the machined shape has been updated, and then the process is repeated from step S74 again.

Subsequently, when the machined shape is not updated any more, it is determined whether the template counter T is a maximum value (S84). When the template counter T is not a maximum value, the template counter T is incremented by 1 (S85) and then the process is repeated from step S74. That is, an optimal process candidate is determined for each of the plurality of basic tooling templates.

Then, when the template counter T reaches the maximum value, it is determined whether the tool edge diameter counter P is a maximum value (S86). When the tool edge diameter counter P is not a maximum value, the tool edge diameter counter P is incremented by 1 (S87), and then the process is repeated from step S72. That is, an optimal process candidate is determined for each of the plurality of tool edge diameters and each of the plurality of basic tooling templates. Then, when the tool edge diameter counter P reaches the maximum value, the efficiency-specific process candidate determining process is ended.

As described above, a machined shape is determined from each of the plurality of basic tooling templates. That is, an optimal process candidate is determined for each basic tooling template. Here, there are a large number of various holder shapes and a large number of various tool projection lengths. That is, by providing a plurality of basic tooling templates, it is compatible with various combinations of a tool, a holder and a tool projection length. That is, by using a plurality of basic tooling templates, it is possible to determine an appropriate optimal process candidate.

In the example of the above first embodiment, the optimal process determining system intended for a five-axis machine tool that is able to change the index angle (tool axis position) is described. The intended five-axis machine tool may be not only a five-axis index machine tool but also a five-axis simultaneous machine tool. The five-axis index machine tool carries out machining so that, in a state where at least one of the rotation axes is indexed (fixed), the other rotation axes are moved. In addition, the five-axis simultaneous machine tool carries out machining while simultaneously controlling travel axes and rotation axes.

Other than the above, the aspect of the invention may also be applied to an optimal process determining system intended for a machine tool that is able to move along only three orthogonal axes. This example eliminates processes regarding the index angle (tool axis position). Specifically, steps S13 to S18 and S22 in the efficiency-specific process candidate determining process shown in FIG. 7 can be eliminated. The other configuration is substantially the same.

What is claimed is:

1. An optimal process determining system comprising:
   a shape memory unit that stores a material shape and a product shape;
   a tool holder information storage unit that stores information of a plurality of tools and information of a plurality of holders;
   a basic tooling storage unit that stores a basic tooling composed of a combination of a tool, a holder and a tool projection length or a basic tooling template corresponding to the basic tooling for each of a plurality of machining efficiency groups; and
   a process determining unit that determines an optimal process, composed of a plurality of individual processes and a sequence of the plurality of individual processes, for forming the product shape from the material shape, wherein
   the process determining unit executes:
   a machined shape determining step of determining a machined shape machined by the basic tooling or basic tooling template of each machining efficiency group from the material shape;
   a tooling selecting step of selecting an optimal tooling composed of a combination of a tool, a holder and a tool projection length on the basis of information of the tools and the holders, stored in the tool holder information storage unit, the combination having a maximum machining efficiency and being able to form the material shape into a corresponding one of the machined shapes without interfering with the machined shape, wherein the tool projection length is a length by which the tool projects from the holder, and the maximum machining efficiency is the highest removal volume per unit time;
   a process candidate determining step of determining an optimal process candidate using the optimal tooling of each machining efficiency group; and
   a process determining step of determining the optimal process on the basis of the optimal process candidate of each machining efficiency group, and wherein
   each of the individual processes of the optimal process includes a tooling, comprising the tool, the holder and the tool projection length, and a removal region.

2. The process determining system according to claim 1, wherein
   the tool holder information storage unit stores information of the tools having a plurality of edge diameters,
   the tooling selecting step determines the optimal tooling for each of the edge diameters of the tools, stored in the tool holder information storage unit, and
   the process candidate determining step determines the optimal process candidate using the optimal tooling of each of the machining efficiency groups and each of the edge diameters of the tools.

3. The process determining system according to claim 1, wherein
   the process determining unit executes:
   a total removal region determining step of determining a total removal region when all the plurality of optimal process candidates are executed; and
   a temporary process determining step of determining a temporary optimal process that is able to remove the total removal region when part of the plurality of optimal process candidates is excluded, and wherein
   the process determining step determines the optimal process on the basis of the temporary optimal process.

4. The process determining system according to claim 3, wherein
   the temporary process determined in the temporary process determining step is a process that has a shortest actual machining time when part of the plurality of process candidates is excluded.

5. The process determining system according to claim 1, wherein
   the process determining unit executes:
   a removable region determining step of determining a removable region for each of a plurality of tool axis positions when the material shape is machined by the basic tooling or the basic tooling template; and
   an optimal tool axis position determining step of determining the tool axis position at which a removal volume is maximal among the plurality of removable regions, wherein
   the machined shape determining step determines the machined shape at the tool axis position calculated in the optimal tool axis position determining step, and wherein
   each of the individual processes of the optimal process includes the tooling, the tool axis position and the removal region.

6. The process determining system according to claim 1, wherein
   the basic tooling storage unit stores a plurality of the basic tooling templates, and
   the machined shape determining step determines a machined shape machined by the basic tooling template of each machining efficiency group from the material shape.

7. The process determining system according to claim 6, wherein
   the plurality of basic tooling templates include a template having an inverted conical holder portion and a template having a circular cylindrical holder portion.

8. The process determining system according to claim 7, wherein
   the template having the circular cylindrical holder portion is a template having a holder portion in which a small-diameter circular cylindrical shape and a large-diameter circular cylindrical shape are connected to form an inverted stepped shape.

9. A process determining method comprising:
   storing a material shape and a product shape in a shape memory unit;
   storing information of a plurality of tools and a plurality of holders in a tool holder information storage unit;
   storing a basic tooling comprising a combination of a tool, a holder and a tool projection length or a basic tooling template corresponding to the basic tooling for each of a plurality of machining efficiency groups in a basic tooling storage unit;

a machined shape determining step of determining a machined shape machined by the basic tooling or basic tooling template of each machining efficiency group from the material shape;

a tooling selecting step of selecting an optimal tooling comprising a combination of a tool, a holder and a tool projection length on the basis of information of the tools and the holders, stored in the tool holder information storage unit, the combination having a maximum machining efficiency and being able to form the material shape into a corresponding one of the machined shapes without interfering with the machined shape, wherein the tool projection length is a length by which the tool projects from the holder, and the maximum machining efficiency is the highest removal volume per unit time;

a process candidate determining step of determining an optimal process candidate using the optimal tooling of each machining efficiency group; and a process determining step of determining an optimal process, comprising a plurality of individual processes and a sequence of the individual processes, for forming the product shape from the material shape, on the basis of the process candidate of each machining efficiency group, wherein each of the individual processes of the optimal process includes a tooling, comprising the tool, the holder and the tool projection length, and a removal region.

* * * * *